(12) United States Patent
Fox et al.

(10) Patent No.: US 7,360,280 B2
(45) Date of Patent: Apr. 22, 2008

(54) COTTON CONDITIONER FOR A COTTON HARVESTER

(75) Inventors: Jeffrey Robert Fox, Minburn, IA (US); Mark Samuel Philips, Grimes, IA (US)

(73) Assignee: Deere & Company, Moline, IL (US)

( * ) Notice: Subject to any disclaimer, the term of this patent is extended or adjusted under 35 U.S.C. 154(b) by 135 days.

(21) Appl. No.: 11/214,253

(22) Filed: Aug. 29, 2005

(65) Prior Publication Data

US 2007/0044276 A1    Mar. 1, 2007

(51) Int. Cl.
*D01B 9/00* (2006.01)
(52) U.S. Cl. .................................... 19/66 CC
(58) Field of Classification Search .............. 19/35–38; 56/36, 41
See application file for complete search history.

(56) References Cited

U.S. PATENT DOCUMENTS

| | | | | |
|---|---|---|---|---|
| 2,100,300 A * | 11/1937 | Mitchell | ...................... | 19/37 |
| 3,528,232 A | 9/1970 | Fachini | ...................... | 56/44 |
| 4,470,245 A * | 9/1984 | Agadi | ...................... | 56/28 |
| 4,896,491 A | 1/1990 | Warnsholz et al. | ............ | 56/28 |
| 5,247,786 A | 9/1993 | Schreiner | ...................... | 56/41 |
| 5,471,826 A * | 12/1995 | Schreiner | ...................... | 56/41 |
| 5,519,988 A | 5/1996 | Copley et al. | ................. | 56/30 |
| 5,557,910 A | 9/1996 | Del Rosario | | |
| 6,212,864 B1 | 4/2001 | Harden et al. | ................. | 56/36 |
| 6,293,078 B1 | 9/2001 | Deutsch et al. | ................ | 56/44 |
| 6,408,605 B1 | 6/2002 | Orsborn et al. | ................ | 56/41 |
| 6,550,230 B2 | 4/2003 | Fox | ............................ | 56/44 |
| 6,591,597 B1 | 7/2003 | Stueck et al. | .................. | 56/41 |
| 6,672,041 B1 | 1/2004 | Keeter | .......................... | 56/41 |

FOREIGN PATENT DOCUMENTS

| | | |
|---|---|---|
| SU | 120973 | 7/1959 |
| SU | 206226 | 1/1968 |

* cited by examiner

*Primary Examiner*—Shaun R. Hurley

(57) ABSTRACT

A conditioning mechanism is placed forwardly of the cotton harvesting mechanism on a cotton harvester. Opposing elements compress portions of the cotton plant to compress the cotton bolls and deform the cotton boll hulls. The deformation loosens the cotton fiber relative to the hulls to improve the ability of the harvesting mechanism to harvest the seed and fiber. In one embodiment, differential surface velocity of the opposing elements improves boll opening and fiber orientation for more effective spindle contact.

24 Claims, 5 Drawing Sheets

COTTON CONDITIONER FOR A COTTON HARVESTER

FIELD OF THE INVENTION

The present invention relates generally to cotton harvesters, and more specifically to structure for enhancing the ability of a cotton harvesting unit to harvest cotton fiber and seed from the cotton plant.

BACKGROUND OF THE INVENTION

Cotton fiber is held in a cotton boll, and each fiber is attached to one of several cotton seeds in the boll. When the boll matures, the boll opens to expose the fiber. The seeds are retained in cavities created by the open bolls or hulls.

Various types of cotton harvesting devices include mechanisms that contact and extract the cotton seed and fiber from the cotton plant. Harvesting efficiency depends on the ability of the mechanisms to remove the seed and fiber from the open bolls which, in turn, depends on the seed and fiber connection to the cotton boll hulls. If the fiber and seed are strongly linked to the hull, harvesting efficiency can be greatly reduced. Fiber orientation also affects the separating efficiency, and if the fibers are not exposed satisfactorily, the ability of the harvesting mechanisms to contact and remove the fiber is reduced.

SUMMARY OF THE INVENTION

It is therefore an object of the present invention to improve harvesting of cotton fiber and seed from cotton plants. It is another object to overcome one or more of the aforementioned problems.

It is another object of the present invention to provide a structure for improving cotton harvesting efficiency. It is another object to provide such a structure which conditions the cotton boll prior to extraction of the fiber and seed by the harvesting mechanism. It is still a further object of the invention to provide such a structure for various types of harvesters such as spindle type cotton pickers and strippers. It is still a further object to provide such a structure which is mountable at different locations on a harvester, including but not limited to locations ahead of a spindle unit, between two drums of a spindle unit, and upstream of a cotton cleaner.

It is another object of the present invention to provide a boll preconditioning mechanism for a cotton harvester. It is another object to provide such a mechanism which loosens the connection of the fiber to the boll hull. It is still another object to provide such a mechanism that helps orient fiber to increase the opportunity for harvesting elements to contact the fiber and remove the fiber and seed.

A conditioning mechanism is placed forwardly of the cotton harvesting mechanism or a portion of the harvesting mechanism. In an embodiment of the invention, opposing elements compress portions of the cotton plant. The compressive action compresses the cotton bolls to deform the hulls and loosen the cotton from the hulls to improve the ability of the harvesting mechanism to harvest the seed and fiber.

These and other objects, features and advantages of the present invention will become apparent from the following description taken in view of the drawings.

DESCRIPTION OF THE PREFERRED EMBODIMENT

Figure 1:
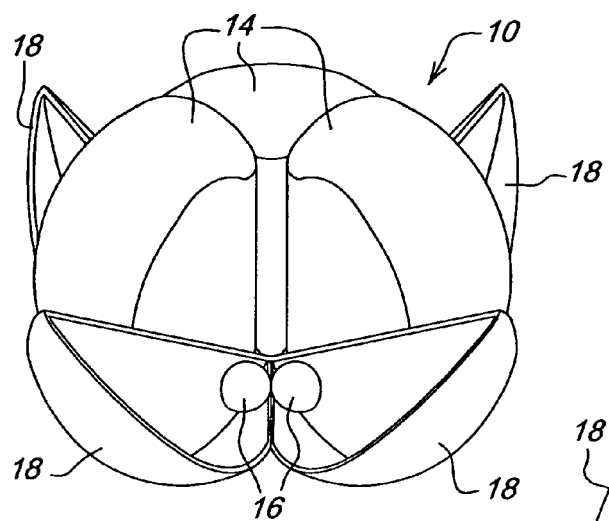
FIG. 1 is a perspective view of a normal cotton boll (with a lock removed to more clearly show burs and seed) showing the burs open and cotton fiber exposed for harvest.
Figure 2:
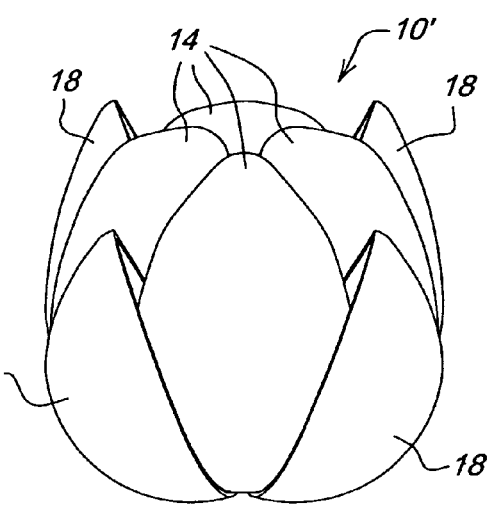
FIG. 2 is a perspective view of a tight cotton boll not fully open.
Figure 3:
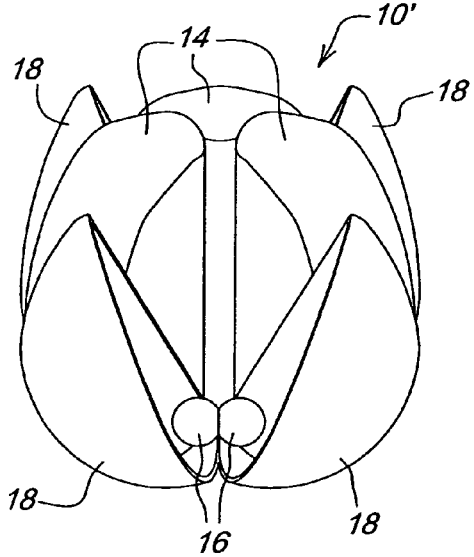
FIG. 3 is a view similar to FIG. 2 but with a lock removed to better show the burs and seeds.

Referring now to FIG. 1, therein is shown a cotton boll 10 from a cotton plant 12. The boll 10 includes four groupings or locks 14 of cotton fibers attached to seeds 16. One of the locks 14 is removed in FIG. 1 for clarity. Burs 18 generally encase the locks 14 as the cotton plant matures. When the plant is ripe, the burs 18 open as shown in FIG. 1 to expose the cotton fibers. However, many bolls do not open fully, as shown by the boll 10' in FIGS. 2 and 3. The fibers on the partially open bolls 10' are not fully exposed and the seeds 16 are tightly held.

Figure 5:
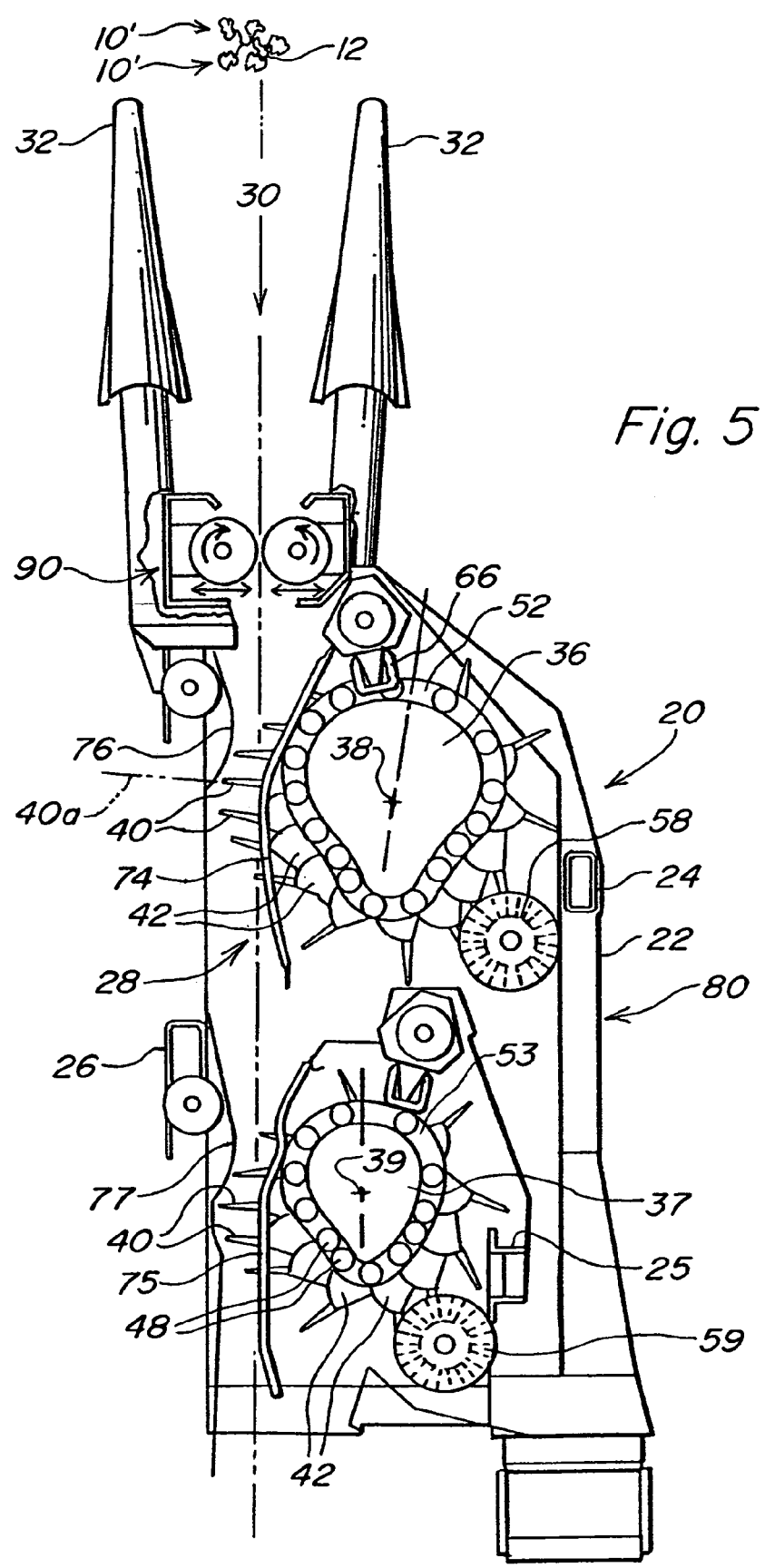
FIG. 5 is a top view of a cotton harvester row unit having a forwardly mounted cotton conditioner.
Figure 6:
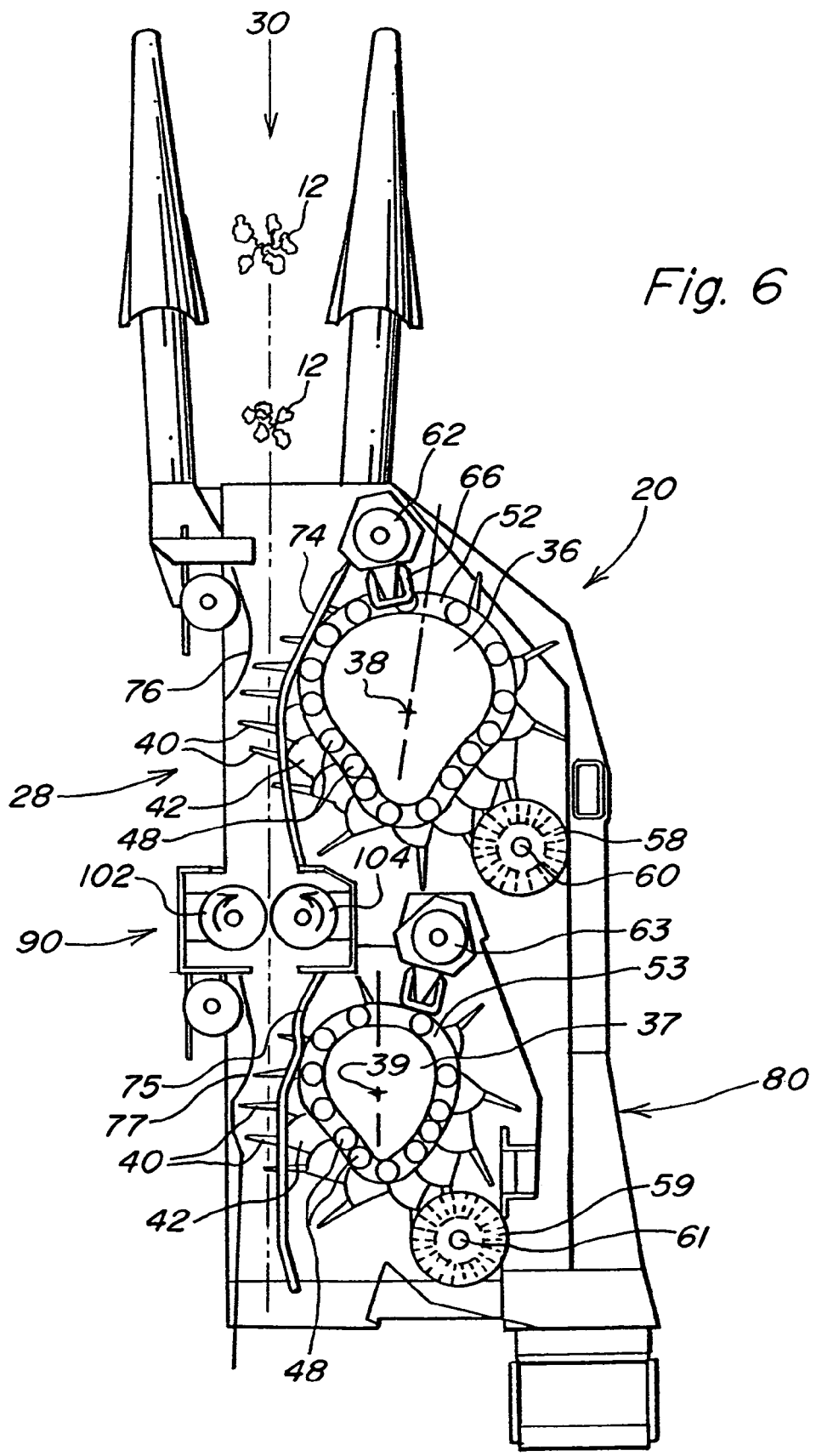
FIG. 6 is a top view similar to that of FIG. 5 but showing the cotton conditioner mounted between two spindle drums.

Referring now to FIGS. 5 and 6, therein is shown a row unit 20 for a cotton picker. The row unit 20 includes a housing 22 with upright structural members such as at locations 24, 25 and 26. A fore-and-aft extending row-receiving area 20 is defined which extends rearwardly from between a pair of stalk lifters 32 through to the rear of the housing towards a harvesting element 28. As shown in FIGS. 5 and 6, the harvesting element 28 includes front and rear upright picker drums 36 and 37 with upright rotational axes 38 and 39 supported within the housing 12 and include spindles 40 supported in rows by a plurality of upright picker bars 42 supported by the drums 36 and 37. Each picker bar 42 includes a cam arm 48 with an upper cam roller supported within the track of a respective cam 52 or 53 which orients the bars 42 for the desired spindle position as the drum rotates about its upright axis. The spindles are rotated about spindle axes 40a.

Doffer columns 58 and 59 are supported for rotation about upright axes 60 and 61 parallel to and rearwardly and outwardly of the corresponding drum axes 38 and 39 for doffing cotton from the spindles. Supported adjacent the forward portion of the drums 36 and 37 are upright moistener columns 62 and 63 with pads 66 for wiping the spindles 40 after cotton is doffed therefrom. A conventional drive mechanism (not shown) located in the upper portion of the housing 22 rotates the drums, spindles and doffers. As the drums 36 and 37 rotate, the path of the spindles 40 is controlled by the cam arrangement so that the spindles 40 project into the row-receiving area through grid bars 74 and 75 and rotate in contact with the cotton. The spindles 40 are barbed and rotate in contact with the exposed fibers of the cotton bolls 10 and 10'. As shown in the drawings, the row unit 20 is an in-line unit with the drums and drum axes on one side only of the row-receiving area so that cotton is picked from one side of the plant. Pressure plates 76 and 77 urge the plants inwardly toward the spindles 40. The spindles 40 are guided under the doffers of the doffer columns 58 and 59, and cotton is doffed from the spindles and directed rearwardly and outwardly to door structure 80 to be conveyed to the harvester basket (not shown).

Figure 7:
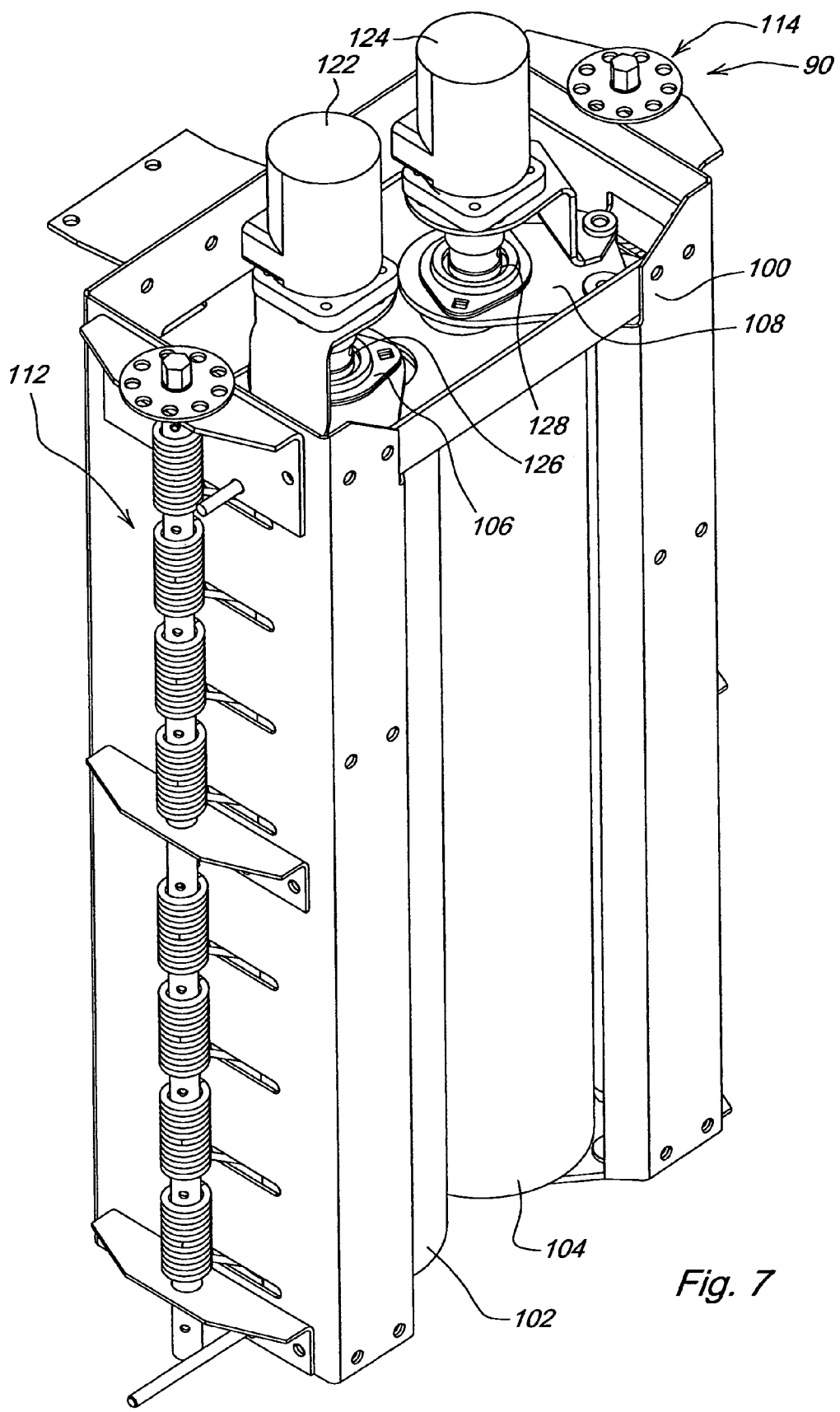
FIG. 7 is a perspective view of a cotton conditioner.

To condition the cotton plants to better expose the fibers to the spindles of the harvesting element 28, a cotton conditioner structure indicated generally at 90 in FIG. 7 is provided forwardly of at least one of the drums 36 and 37 in the row-receiving area 30 and forwardly of a harvesting mechanism. As shown in FIG. 5, the conditioner structure is located at the throat of the row unit 20 just forwardly of the forward drum 36 and forwardly of the pressure plate 76. Alternatively, the conditioner 90 can be located between the drums of a multi-drum picking unit. As shown in FIG. 6, the conditioner structure 90 is centrally located in the housing 22 between the drum axes 38 and 39 forwardly of the rear pressure plate 77. In this embodiment, the conditioner structure 90 conditions bolls 10 and 10' remaining on the plants after the plants are contacted by the spindles 40 on the forward spindle drum 36 and just prior to entry of the spindles 40 of the rear drum 37 into the plants.

One embodiment of the conditioner structure 90 as shown in FIG. 7 includes a conditioner housing 100 supporting a pair of upright cylinders 102 and 104 for rotation about upright axes generally parallel to the drum axes 38 and 39. The cylinders 102 and 104 are carried on pivoting supports 106 and 108 and are biased inwardly towards each other and towards the cotton row centerline by adjustable spring assemblies 112 and 114 mounted on the sides of the housing 100. The spring assemblies 112 and 114 bias the cylinders 102 and 104 to a generally closed position (shown). The cylinders 102 and 104 pivot move outwardly and slightly rearwardly against the bias as the cotton plants 12 pass between the cylinders. The bias of the spring assemblies 112 and 114 can be changed to accommodate different harvest conditions to assure adequate cylinder pressure against the plants 12 for boll conditioning.

Figure 4:
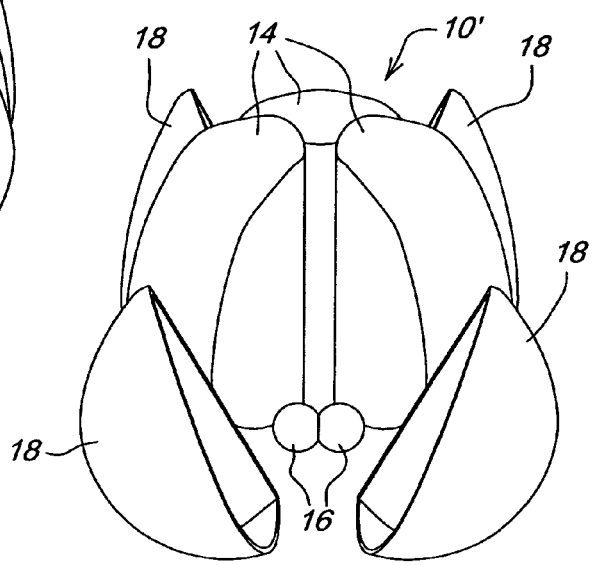
FIG. 4 is a view similar to FIG. 3 but showing the boll after processing by a cotton conditioner.

The cylinders 102 and 104 may be driven in any suitable fashion, such as by motors 122 and 124 supported above the cylinders and connected to shafts 126 and 128 projecting through bearing assemblies in the cylinder mount. The motors 122 and 124 may be, for example, hydraulic or electric motors. Alternatively, the cylinders 102 and 104 can be driven by a belt, chain or gear drive powered by a single motor or from the drive for the row unit 20. The cylinders 102 and 104 are driven at a speed so that surface velocity approximately matches the velocity vector of the plants or portions of the plants as they pass through the cylinders. To maximize boll conditioning and optimize fiber orientation for better spindle contact with the fibers, one of the cylinders 102 and 104 can be rotated so the surface velocity is greater than that of the other cylinder. The differential surface velocity tends to roll the bolls 10 and 10' to better separate and open the burs 18, as shown in FIG. 4. The differential surface velocity also tends to draw and string out the fibers in a direction to increase the perpendicular component of the fibers relative to the axes of the rotating spindles 40, thereby increasing the likelihood of the spindles making effective contact with the fibers.

Figure 8:
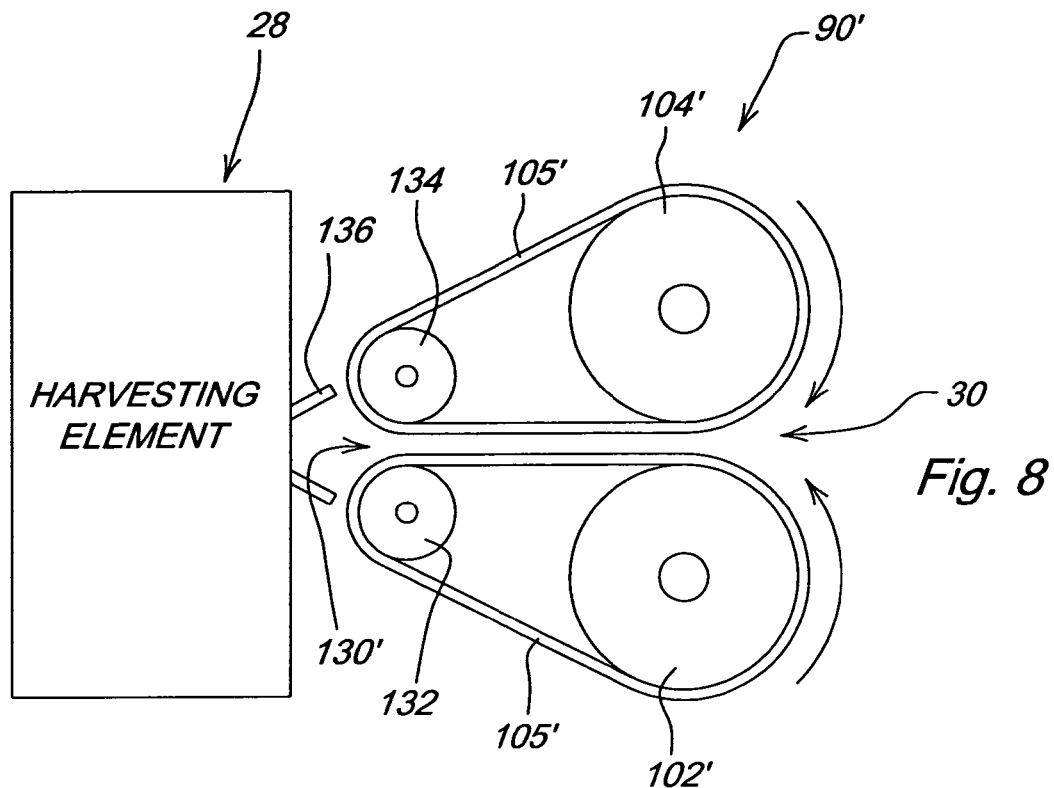
FIG. 8 is a schematic representation of another cotton conditioner including belts.
Figure 9:
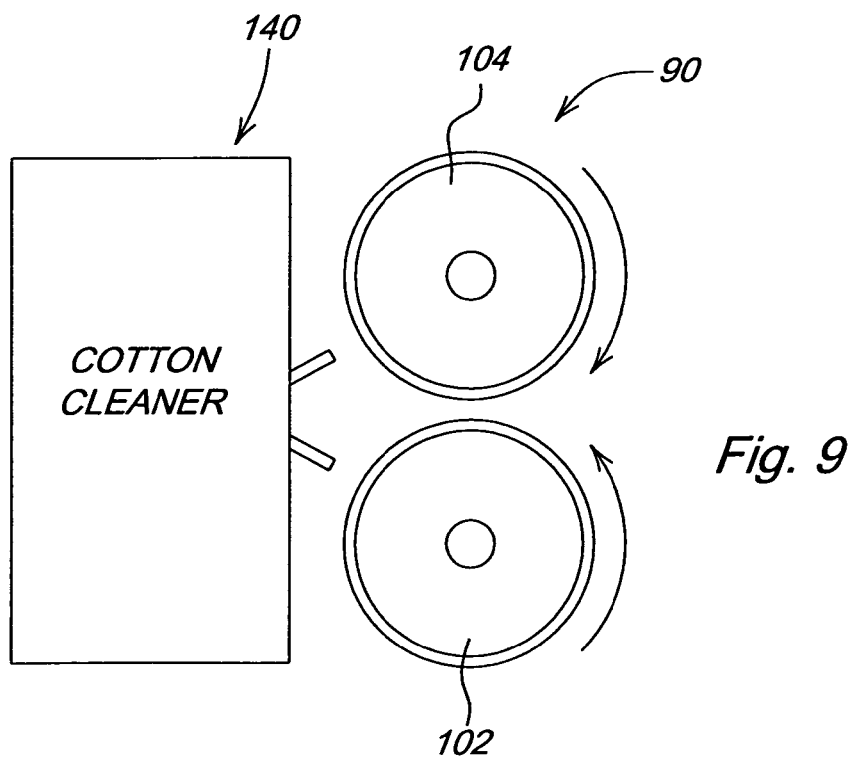
FIG. 9 is a schematic representation of a cotton conditioner upstream of a cotton cleaner on a cotton stripper.

Various other types of surfaces other than cylindrical surfaces may also be used for the conditioner structure 90. As shown in FIG. 8, the conditioner structure 90' includes cylinders 102' and 104' driving belts 105'. The belts 105' can each be a single wide belt or a plurality of narrow belts generally defining a conditioning plane 130' aligned with the plant row or plant path 30. The belts 105' are also trained around an idler or drive arrangement 132 and 134 to define the conditioning plane which is upstream of the input or throat 136 to the particular harvesting element utilized in the machine. Although two driven surfaces are shown, it is also possible to utilize other combination of driven or non-driven elements such as a single driven belt or cylinder and an opposed non-driven element. The non-driven element can be a device similar to a pressure plate or a rotatable cylinder, belt, stacked wheel or idler device. If a more aggressive gripping arrangement is desired, the belt, wheat, cylinder or other moving surface device can be equipped with treads or protrusion to engage the cotton plant material. As shown in FIG. 9, the conditioner structure 90 or 90' can be utilized with a cotton cleaner such as shown at 140. Conditioner structure 90 can also be utilized with other non-spindle type harvesting mechanisms wherein boll conditioning and/or fiber orientation would be advantageous.

Having described the preferred embodiment, it will become apparent that various modifications can be made without departing from the scope of the invention as defined in the accompanying claims.

The invention claimed is:

1. A cotton plant conditioner for enhancing the removal of cotton fibers and seed from cotton bolls on cotton plants by a harvesting unit, the conditioner comprising:
   first and second elements extending on opposite sides of the cotton plants for engaging generally all the cotton bolls on the cotton plants;
   the first element being elongated and rotatable at a speed for engaging one side of the cotton bolls;
   the second element engaging the bolls at a side of the bolls generally opposite the one side of the bolls, the first and second elements generally containing all the cotton bolls as the cotton bolls pass between the first and second elements; and
   the first element having a moving surface engaging and compressing the cotton bolls against the second element to expose cotton fibers in the bolls thereby increasing likelihood of contact between the cotton fibers and the harvesting unit for removal of the cotton fibers from the cotton plants by the harvesting unit downstream of the conditioner.

2. The conditioner as set forth in claim 1 wherein the first and second elements are located upstream of the harvesting unit.

3. The conditioner as set forth in claim 2 wherein the harvesting unit comprises a spindle harvesting unit, wherein the conditioner is located upstream of an area wherein spindles enter the cotton plant.

4. The conditioner as set forth in claim 1 wherein the rotating element is located between a pair of cotton picking drums on the harvesting unit.

5. The conditioner as set forth in claim 1 wherein the harvesting unit comprises a cotton stripper having a cotton cleaner mechanism, and wherein the rotating element is located upstream of the cotton cleaner mechanism.

6. The conditioner as set forth in claim 1 wherein the first element comprises a belt.

7. The conditioner as set forth in claim 6 wherein the second element comprises a cylinder.

8. The conditioner as set forth in claim 1 wherein the first and second elements comprise boll engaging surfaces having differential tangential speeds for exposing the fibers from the boll and directing the fibers predominantly in one direction for the increased contact with the harvesting unit, wherein one at least one of the elements is driven at a tangential speed that is approximately equal to speed of the cotton plants passing between the elements.

9. The conditioner as set forth in claim 1 wherein the first and second elements are both located forwardly of fiber-engaging spindles of the harvesting unit to expose the cotton fibers prior to entry of the spindles into the cotton plant, the spindles removing the fibers from the cotton plants after the cotton plants exit the first and second elements.

10. A method of conditioning cotton plants for harvest by a cotton harvesting unit having fiber-engaging members for removing cotton fibers from hulls of cotton bolls, the method comprising the steps of:
compressing substantially all the cotton bolls on the cotton plants prior to removing the cotton fibers from the bolls in the harvesting unit, the step of compressing the cotton plants including deforming the hulls to loosen the cotton fiber from hulls prior to the cotton plants entering the harvesting unit.

11. The method of conditioning set forth in claim 10 wherein the step of compressing the cotton plant occurs before engagement of the fiber-engaging members with the cotton fibers.

12. The method as set forth in claim 10 wherein the step of compressing the cotton plants comprises compressing the cotton bolls to cause cotton fibers to be exposed from the bolls generally in a preselected direction to facilitate engagement of the fiber-engaging members with the cotton fibers.

13. The method as set forth in claim 10 wherein the step of compressing includes imparting a differential velocity to opposite sides of the bolls to deform the bolls.

14. The method as set forth in claim 10 wherein the step of compressing includes moving the cotton plants between two rotating surfaces.

15. The method as set forth in claim 14 wherein the step of compressing includes rotating two cylinders at speeds providing tangential velocities generally approaching the speed of the cotton plants relative to the surfaces.

16. The method as set forth in claim 10 wherein the step of compressing includes moving the cotton plants between a first belt element and a second element, and driving the belt.

17. The method as set forth in claim 16 wherein the step of moving the cotton plants includes moving the cotton plants between the first belt element and a second belt element.

18. The method as set forth in claim 17 further including the step of moving the first and second belt elements at different speeds to deform the hulls.

19. The method as set forth in claim 10 wherein the step of compressing the cotton plants includes compressing the plants rearwardly of a first cotton spindle drum and forwardly of a second cotton spindle drum prior to engagement of the cotton plants by the second cotton spindle drum.

20. A conditioner for a cotton harvester unit having a harvesting mechanism that removes seed and fiber from the hulls of cotton bolls on cotton plant material, the conditioner comprising:
means for deforming the bolls of substantially all the cotton plant material prior to engagement of the fiber by the harvesting mechanism; and
wherein the means for deforming includes means for exposing the fibers from the boll predominantly in a direction to enhance contact between the harvesting mechanism and the fiber prior to engagement of the fiber by the harvesting mechanism, wherein the means for exposing the fibers comprises first and second offset elements contacting and compressing the cotton bolls therebetween.

21. The conditioner as set forth in claim 20 wherein the cotton plant material moves relative to the conditioner at a plant material velocity and wherein the first element includes a first rotating surface having a surface velocity approximately equal to the plant material velocity.

22. The conditioner as set forth in claim 21 wherein the second element includes a rotating surface opposite the first rotating surface, the cotton plant material pressed between the rotating surfaces.

23. The conditioner as set forth in claim 22 including means for rotating the first and second rotating surfaces at different velocities to deform the cotton bolls.

24. The conditioner as set forth in claim 20 wherein the harvesting mechanism comprises an elongated spindle with a spindle axis and the first and second offset elements includes a rotating member for stringing out the fiber at an angle to the spindle axis.

* * * * *